US011942673B2

(12) United States Patent
Lu et al.

(10) Patent No.: US 11,942,673 B2
(45) Date of Patent: Mar. 26, 2024

(54) SIGNAL PROCESSING DEVICE COMPRISING A TARGET APPARATUS COUPLED TO A FEEDING APPARATUS BY CONNECTION MEMBERS PROVIDING CAPACITIVE AND INDUCTIVE IMPEDANCES

(71) Applicant: CommScope Technologies LLC, Hickory, NC (US)

(72) Inventors: Jianpeng Lu, Suzhou (CN); Hangsheng Wen, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 275 days.

(21) Appl. No.: 17/342,698

(22) Filed: Jun. 9, 2021

(65) Prior Publication Data

US 2021/0399426 A1 Dec. 23, 2021

(30) Foreign Application Priority Data

Jun. 23, 2020 (CN) ......................... 202010579156.5

(51) Int. Cl.
*H01P 5/08* (2006.01)
*H01P 1/04* (2006.01)

(52) U.S. Cl.
CPC .............. *H01P 5/085* (2013.01); *H01P 1/045* (2013.01); *H01P 1/047* (2013.01)

(58) Field of Classification Search
CPC ........... H01P 5/085; H01P 1/045; H01P 1/047
USPC ..................................................... 333/33, 246
See application file for complete search history.

(56) References Cited

U.S. PATENT DOCUMENTS 3,201,721 A * 8/1965 Voelcker ................. H01P 5/085 333/260
4,951,011 A * 8/1990 Heckaman et al. .... H01P 5/085 174/559
5,418,505 A * 5/1995 Agarwal et al. ........ H01P 5/085 333/33
6,007,347 A * 12/1999 Keldsen et al. ..... H05K 1/0219 439/63
6,661,318 B2 * 12/2003 Tamaki et al. .......... H01P 5/085 333/260
6,927,655 B2 * 8/2005 Torigoe et al. ......... H01L 23/66 333/260
2012/0244727 A1 * 9/2012 Harel et al. ............. H01P 5/085 439/63

* cited by examiner

*Primary Examiner* — Benny T Lee
(74) *Attorney, Agent, or Firm* — Myers Bigel, P.A.

(57) ABSTRACT

A signal processing device may include a feeding apparatus having a first conductor configured to transmit a radio frequency signal; an insulating medium covering the first conductor; and a second conductor covering the insulating medium. The conductor may have first, second, and third portions. The third portion of the first conductor may be configured to be connected to the target apparatus to feed the radio frequency signal to the target apparatus and configured to form a capacitive impedance with the target apparatus, and the second portion of the first conductor may be configured to form an inductive impedance with the target apparatus. An absolute value of a sum of the capacitive impedance and the inductive impedance may be less than or equal to a preset impedance threshold.

20 Claims, 5 Drawing Sheets

SIGNAL PROCESSING DEVICE COMPRISING A TARGET APPARATUS COUPLED TO A FEEDING APPARATUS BY CONNECTION MEMBERS PROVIDING CAPACITIVE AND INDUCTIVE IMPEDANCES

CROSS-REFERENCE TOR RELATED APPLICATION

The present application claims priority under 35 U.S.C. § 119 to Chinese Patent Application No. 202010579156.5, filed on Jun. 23, 2020, with the China National Intellectual Property Administration, and the entire contents of the above-identified application are incorporated by reference as if set forth herein.

TECHNICAL FIELD

The present disclosure relates to the field of communications technologies, and in particular, to signal processing devices and antenna systems.

BACKGROUND

Signal processing often involves sending a radio frequency signal to a certain target apparatus, so as to achieve a corresponding function. However, since the radio frequency signal, particularly a U-band signal, etc., may have a very high sensitivity to inductive impedance and capacitive impedance, it may be difficult to use a conventional feeding structure to achieve a good feeding effect.

SUMMARY OF THE INVENTION

Among the objects of the present disclosure is to provide novel signal processing devices and antenna systems.

According to some aspects of the present disclosure, a signal processing device may include a target apparatus and a feeding apparatus. The feeding apparatus may include: a first conductor configured to transmit a radio frequency signal; an insulating medium covering the first conductor; and a second conductor covering a first portion of the insulating medium. A first portion of the insulating medium may be covered by the second conductor and a second portion of the insulating medium may extend beyond a first end of the second conductor. A first portion of the first conductor may be covered by both the second conductor and the insulating medium and a second portion of the first conductor may extend beyond the first end of the second conductor and may be covered by only the insulating medium. A third portion of the first conductor may extends beyond a first end of the insulating medium. The third portion of the first conductor may be configured to be connected to the target apparatus to feed the radio frequency signal to the target apparatus and is configured to form a capacitive impedance with the target apparatus, the second portion of the first conductor is configured to form an inductive impedance with the target apparatus, and an absolute value of a sum of the capacitive impedance and the inductive impedance is less than or equal to a preset impedance threshold.

According to some aspects of the present disclosure, there is provided a signal processing device comprising: a target circuit board comprising a substrate, a conductive member connecting a first side and a second side opposite the first side of the substrate, and a target circuit disposed on the first side, the conductive member being electrically connected to the target circuit; and a feeding cable comprising a first conductor electrically connected to the conductive member on the second side of the substrate; wherein the feeding cable is configured such that a maximum bending curvature of the feeding cable is less than or equal to a preset curvature threshold in an extension direction thereof.

According to some aspects of the present disclosure, there is provided a signal processing device comprising a target apparatus and a feeding apparatus; wherein the feeding apparatus comprises: a first connection member configured to form a capacitive impedance with the target apparatus; a second connection member electrically connected to the first connection member, the second connection member configured to form an inductive impedance with the target apparatus; wherein at least one of the first connection member and the second connection member is configured to be directly electrically connected to the target apparatus, so as to feed a radio frequency signal passed through the first connection member and the second connection member to the target apparatus, and an absolute value of a sum of the capacitive impedance and the inductive impedance is less than or equal to a preset impedance threshold.

According to some aspects of the present disclosure, there is provided a signal processing device comprising: a feeding cable configured to transmit a radio frequency signal; a feeding circuit board comprising a feeding circuit electrically connected to the feeding cable and configured to transmit the radio frequency signal; and a target circuit board comprising a target circuit, the target circuit being electrically connected to the feeding circuit, and the target circuit board being mechanically connected to the feeding circuit board; wherein a position of the feeding circuit board relative to the target circuit board is configured such that a maximum bending curvature of the feeding cable is less than or equal to a preset curvature threshold.

According to some aspects of the present disclosure, there is provided an antenna system comprising the signal processing device as described above.

Other features and aspects of the present disclosure and the advantages thereof will become more apparent from the following detailed description of exemplary embodiments of the present disclosure, which proceeds with reference to the accompanying drawings.

BRIEF DESCRIPTION OF THE DRAWINGS

The accompanying drawings illustrate embodiments of the present disclosure and, together with the description, serve to explain the principles of the present disclosure.

Figure 1:
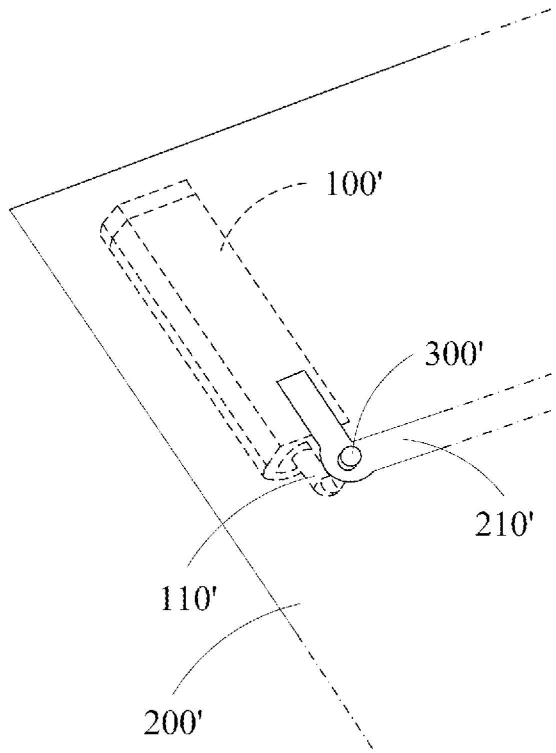
Fig. 1 CONVENTIONAL ART
FIG. 1 is a structure schematic diagram showing a top view of conventional signal processing device.

Note that, in the embodiments described below, in some cases the same portions or portions having similar functions are denoted by the same reference numerals in different drawings, and description of such portions may not be repeated throughout the specification. In some cases, similar reference numerals and letters are used to refer to similar items, and thus once an item is defined in one figure, it need not be further discussed for following figures.

The position, size, range, or the like of each structure illustrated in the drawings and the like are not accurately represented in some cases in order to facilitate a better understanding of the inventive concepts disclosed. Thus, the disclosure is not necessarily limited to the position, size, range, or the like as disclosed in the drawings and the like.

A component shown in dashed lines in a drawing may be obscured by another component from the perspective of the drawing.

DETAILED DESCRIPTION OF THE INVENTION

Various exemplary embodiments of the present disclosure will be described in detail with reference to the accompanying drawings in the following. It should be noted that the relative arrangement of the components and steps, the numerical expressions, and numerical values set forth in these embodiments do not limit the scope of the present invention unless it is specifically stated otherwise.

The following description of some exemplary embodiments is merely illustrative in nature and is in no way intended to limit this disclosure, the applications thereof, or uses thereof. That is to say, the structures and methods discussed herein are illustrated by way of example to explain different embodiments of the structures and methods of the present disclosure. It should be understood by those skilled in the art that, these examples, while indicating the implementations of the present disclosure, are given illustratively, but not exhaustively.

Techniques, methods and devices known to those of ordinary skill in the relevant art may not be discussed in detail, but are intended to be regarded as a part of the specification where appropriate.

In all of the examples as illustrated and discussed herein, any specific values should be interpreted to be illustrative only and non-limiting. Thus, other examples of the exemplary embodiments could have different values.

Figure 2:
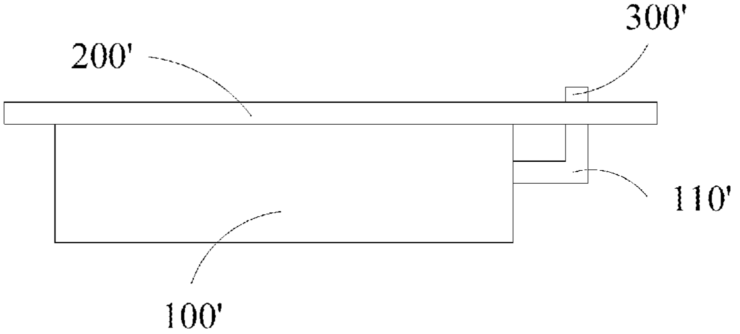
Fig. 2 CONVENTIONAL ART
FIG. 2 is a structure schematic diagram showing a side view of the conventional signal processing device of FIG. 1.

In a first conventional signal processing device, as shown in FIG. 1 and FIG. 2, a feeding cable 100' may extend in a direction parallel or substantially parallel to a surface of a target circuit board 200', and the feeding cable 100' may be located on a back side of the target circuit board 200' (as shown by dashed lines in FIG. 1). In order to electrically connect the feeding cable 100' with a target circuit 210' (FIG. 1) located on a front surface of the target circuit board 200', for example to feed a communication signal (e.g., a radio frequency signal) carried by the feeding cable 100' to the target circuit 210', an inner conductor 110' of the feeding cable 100' may be exposed and bent toward the target circuit board 200' at a suitable position to be electrically connected with the target circuit 210' through, for example, a solder joint 300'. In such a signal processing device, since the feeding cable 100' extends substantially in a direction parallel to the surface of the target circuit board 200', the bending thereof can be very small, and thus a connection between the feeding cable 100' and the target circuit board 200' according to the structural strength requirement can be well achieved generally by a single soldering process and only a single solder joint, without the need of adding an additional fastener or the like. However, in such a signal processing device, at least the exposed inner conductor 110', air or other dielectric between the inner conductor 110' and the target circuit board 200', and the target circuit board 200' will form an inductive impedance, resulting in a low power conversion efficiency of the fed radio frequency signal and a poor feeding effect.

Figure 3:
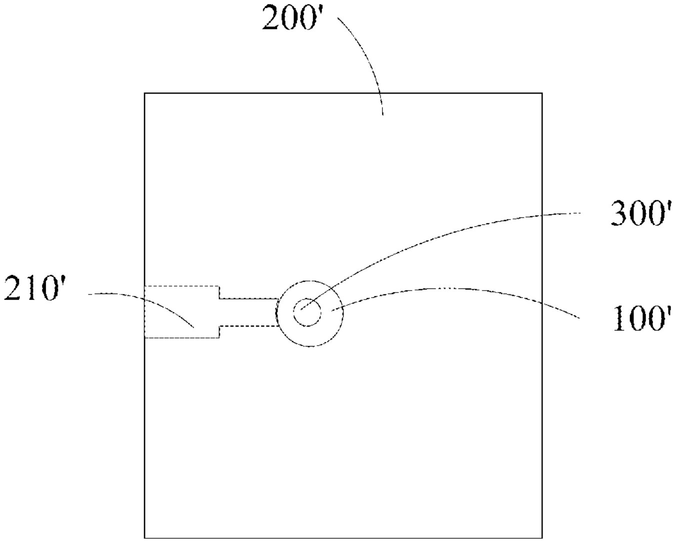
Fig. 3 CONVENTIONAL ART
FIG. 3 is a structure schematic showing a top view of another conventional signal processing device.
Figure 4:
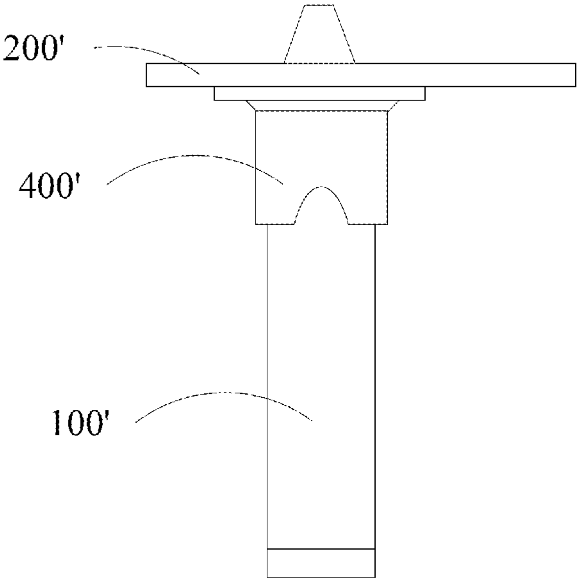
Fig. 4 CONVENTIONAL ART
FIG. 4 is a structure schematic diagram showing a side view of the conventional signal processing device of FIG. 3.

In another conventional signal processing device, as shown in FIG. 3 and FIG. 4, the feeding cable 100' may extend perpendicularly or substantially perpendicularly to the target circuit board 200' at a position close to the target circuit board 200', so as to be connected to the target circuit 210' (FIG. 3) of the target circuit board 200' in a direct vertical feeding manner. This direct vertical feeding (stalk feeding) manner can effectively reduce a magnitude of the impedance formed by the feeding cable 100' and the target circuit board 200', thereby ensuring the power conversion efficiency during the feeding process, so as to have a better feeding effect with respect to the radio frequency signal. However, in such a signal processing device, the extending direction of the feeding cable 100' is greatly restricted, which in practice often results in a large bend (not shown) in the feeding cable 100', and in turn in a large stress at the connection (e.g., the solder joint 300' as shown in FIG. 3) between the feeding cable 100' and the target circuit 210' which can lead to the feeding cable 100' inadvertently detaching from the target circuit 210'. In order to avoid the occurrence of the above-mentioned detachment, a fastener 400' may be additionally added to the periphery of the feeding cable 100' to increase the strength of the connection structure. However, the added fastener 400' (FIG. 4) will result in an increase in material cost. In addition, in order to fix the fastener 400', a secondary soldering is often required, resulting in increased process difficulty and cost.

Exemplary embodiments of the present disclosure provide signal processing devices, which aim to secure a better feeding effect of a radio frequency signal, avoid excessive bending of the feeding cable, make the feeding structure have a good structural strength, and reduce material and process costs as much as possible.

Figure 5:
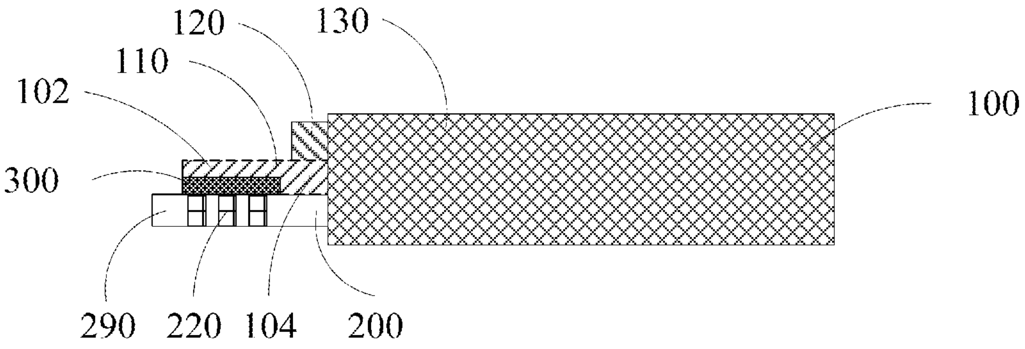
FIG. 5 is a structure schematic diagram showing a side view of a signal processing device according to an exemplary embodiment of the present disclosure.
Figure 6:
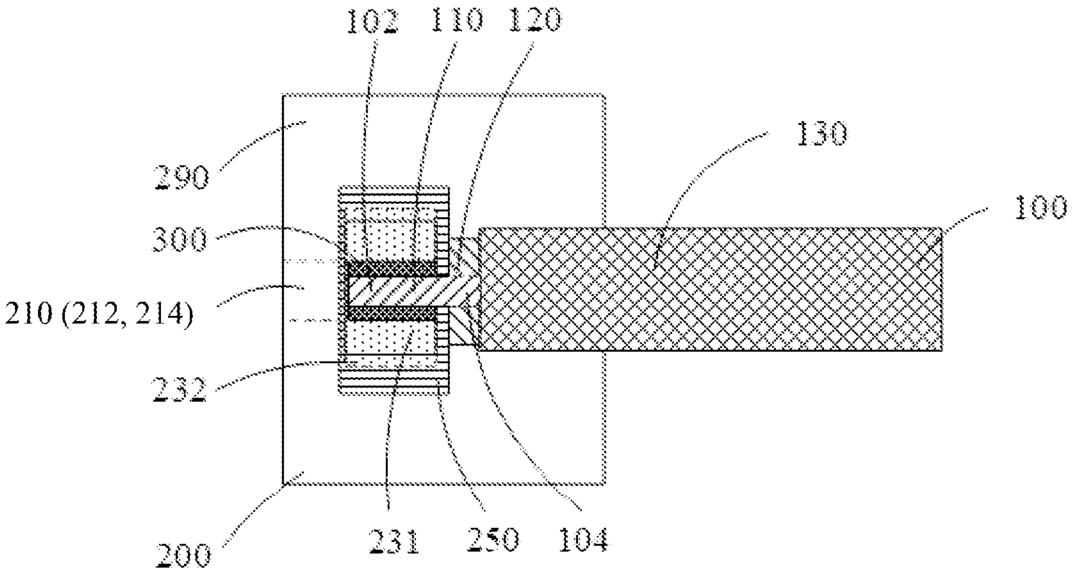
FIG. 6 is a structure schematic diagram showing a bottom view of the signal processing device of FIG. 5.

In an exemplary embodiment of the present disclosure, as seen in FIGS. 5 and 6 a signal processing device is provided. The signal processing device includes a target apparatus and a feeding apparatus, wherein the feeding apparatus includes a first connection member 102 (FIGS. 5 and 6) that is configured to form a capacitive impedance with the target apparatus and a second connection member 104 (FIGS. 5 and 6) that is configured to form an inductive impedance with the target apparatus. The first and second connection members 102, 104 are electrically connected to each other, and at least one of the first and second connection members 102, 104 is directly electrically connected to the target apparatus (e.g., through solder joint 300 of FIG. 6), so as to feed the radio frequency signal passed through the first and second connection members 102, 104 to the target apparatus. The capacitive impedance and the inductive impedance may have opposite signs, and hence the capacitive impedance may at least partially cancel out the inductive impedance. Thus, by providing both a capacitive impedance and the inductive impedance, a better feeding effect of the radio frequency signal may be achieved.

In some embodiments, as shown in FIG. 5 and FIG. 6, the feeding apparatus may include a feeding cable 100. The feeding cable 100 may include a first conductor 110, an insulating medium 120, and a second conductor 130, wherein the first connection member 102 of the above-mentioned feeding apparatus may correspond to a first segment of the first conductor 110 of the feeding cable 100, and the second connection member 104 may correspond to a second segment of the first conductor 110 of the feeding cable 100.

In the feeding cable 100, the first conductor 110 may be configured to transmit a radio frequency signal. In some embodiments, the radio frequency signal may be a U-band signal having a frequency range of 3.6 to 5 GHz, although the present disclosure is not limited thereto.

As shown in FIG. 5 and FIG. 6, a first portion of the insulating medium 120 is covered by the second conductor 130 and a second portion of the insulating medium 120 extends beyond a first end of the second conductor 130. Additionally, a first portion of the first conductor 110 is covered by both the second conductor 130 and the insulating medium 120, a second portion of the first conductor 110 extends beyond the first end of the second conductor 130 and is covered by only the insulating medium 120, and a third portion of the first conductor 110 extends beyond a first end of the insulating medium 120. The exposed third portion of the first conductor 110 (corresponding to the first connection member 102) is configured to be connected to the target apparatus to feed the radio frequency signal to the target apparatus and may form a capacitive impedance with the target apparatus.

The exposed second portion of the insulating medium 120 together with the second portion of the first conductor 110 (which is within the exposed portion of the insulating medium 120 and which corresponds to the second connection member 104) may form an inductive impedance with the target apparatus. An exposed portion of the second conductor 130 may electrically insulate the first portion of the first conductor 110 contained therein from a portion of the target apparatus (e.g., a target circuit board described hereinafter) to prevent the first conductor 110 from short-circuiting.

In some embodiments, the feeding cable 100 may be a coaxial cable, wherein the first conductor 110 corresponds to an inner conductor of the coaxial cable, the insulating medium 120 corresponds to a dielectric layer of the coaxial cable, and the second conductor 130 corresponds to an outer conductor of the coaxial cable. In the coaxial cable, the inner conductor, the dielectric layer and the outer conductor are coaxially arranged to enable transmission of an analog signal and/or a digital signal. The inner conductor and the outer conductor form a current loop, and the outer conductor can be grounded, so that the radio frequency signal emitted from the inner conductor are isolated by the outer conductor, to improve the signal transmission effect.

It will be appreciated that in other embodiments, the feeding apparatus may be in other forms and is not limited to the feeding cable. Also, the first connection member and the second connection member of the feeding apparatus may similarly form a capacitive impedance and an inductive impedance, respectively, with the target apparatus, wherein the capacitive impedance and the inductive impedance at least partially cancel each other to improve the feeding effect.

In an ideal case, when an absolute value of the capacitive impedance is equal to an absolute value of the inductive impedance, the capacitive impedance and the inductive impedance can be completely cancelled, and the signal processing device may have the best feeding effect. However, in practical cases, the absolute values of the capacitive impedance and the inductive impedance may be slightly different, but a good feeding effect can also be obtained as long as an absolute value of a sum of the capacitive impedance and the inductive impedance is less than or equal to a preset impedance threshold. The preset impedance threshold can be determined according to the actual requirement. For example, the preset impedance threshold may be 25%, 20%, 15%, 10%, or 5% of the absolute value of the capacitive impedance, or 25%, 20%, 15%, 10%, or 5% of the absolute value of the inductive impedance, or the like.

Figure 10:
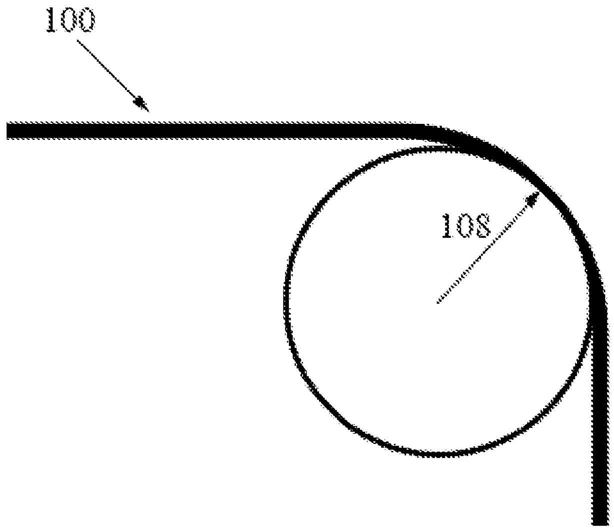
FIG. 10 is a structure schematic diagram showing a portion of a feeding cable and a maximum bending curvature thereof.

Further, in the signal processing device, and as seen in FIG. 10, the extension the a direction of the feeding cable 100 may be configured such that the maximum bending curvature 108 is less than or equal to a preset curvature threshold. For example, in some embodiments, the extension direction of the feeding cable 100 may be parallel to a major surface of the target apparatus. When the maximum bending curvature 108 of the feeding cable 100 is excessively large, a large stress is likely to be introduced therein, resulting in a structural strength at the connection between the feeding cable 100 and the target apparatus being adversely affected. By configuring the extension direction of the feeding cable 100 such that the maximum bending a curvature 108 is less than or equal to the preset curvature threshold, the maximum bending curvature 108 may effectively avoid a large stress caused by excessive bending, thereby securing the structural strength without the need of secondary soldering or addition of other fasteners or the like.

Furthermore, when the bending of the feeding cable 100 is small, the exposed third portion of the first conductor 110 of the feeding cable 100 may be connected to the target apparatus by a single soldering process. A single soldering process can help to effectively reduce material and process costs.

As shown in FIG. 5 and FIG. 6, in some embodiments, the target apparatus may include a target circuit board 200. The target circuit board 200 may be a printed circuit board. The printed circuit board may be commonly grounded with the second conductor 130 of the feeding cable 100. The target circuit board 200 may include a substrate 290, a conductive member connecting a first side and an opposite second side of the substrate 290, and a target circuit 210 (only shown in FIG. 6) disposed on the first side. In some embodiments, the target circuit 210 may include a calibration circuit 212 for beamforming calibration, a power distribution circuit 214 for distributing signal power for different communication links, a phase shifter circuit, or one or more other circuits with specific functionality, etc.

The exposed third portion of the first conductor 110 of the feeding cable 100 is electrically connected to the conductive member on the second side of the substrate 290, and the first conductor 110 is electrically connected to the target circuit 210 on the first side of the substrate 290 through the conductive member connecting the first and second sides of the substrate 290, thereby feeding the radio frequency signal to the target circuit 210. Due to the presence of the conductive member, the extension direction of the feeding cable 100 may be configured more flexibly such that the maximum bending curvature of the feeding cable 100 is less than or equal to the preset curvature threshold.

In some embodiments, as shown in FIG. 5 and FIG. 6, the conductive member may include a first pad 231, a second pad 232 as shown in FIG. 6, and a pad hole 220 as shown in FIG. 5, wherein the first pad 231 is disposed on the first side of the substrate 290, and the first pad 231 is electrically connected to the target circuit 210. The second pad 232 is disposed on the second side of the substrate 290, and the second pad 232 is electrically connected to the first conductor 110. And, the pad hole 220 opened through the substrate 290 physically and electrically connects the first pad 231 and the second pad 232, for example, the pad hole 220 may be a conductive via filled with a conductive material. In some embodiments, the first pad 231 is directly connected to the target circuit 210 and the second pad 232 is directly connected to the first conductor 110. In some embodiments, the first conductor 110 may be electrically connected to the second pad 232 by means of soldering.

The sizes of the first pad 231, the second pad 232 and the exposed second portion of the insulating medium 120 may be designed to cancel the capacitive impedance and the inductive impedance as much as possible. Specifically, by adjusting a relationship between a first pad area of the first pad 231, a second pad area of the second pad 232, and an extension length of the exposed second portion of the insulating medium 120, the absolute value of the sum of the capacitive impedance and the inductive impedance can be made small to improve the feeding effect.

In some embodiments, the first pad 231 and the second pad 232 are spaced apart by the substrate 290, and the first pad 231 and the second pad 232 are disposed opposite each other. As an overlapping area between projections of the first pad 231 and the second pad 232 on the plane of the substrate 290 increases, the capacitive impedance also increases accordingly, so as to cancel out more inductive impedance.

In the specific example shown in FIG. 6, the first pad area may be designed to be larger than the second pad area (e.g., a width of the first pad 231 in a direction perpendicular to the extension direction of the feeding cable 100 is larger than that of the second pad 232), so that the capacitive impedance and the inductive impedance cancel each other as much as possible to improve the feeding effect of the signal.

In some embodiments, as shown in FIG. 6, on the second side of the target circuit board 200, an electrical isolation region 250 may also be provided, and the material in the electrical isolation region 250 is insulating, so that the first conductor 110 may be electrically isolated from the ground of the target circuit board, to avoid short-circuiting the first conductor 110 to ground.

In the above-described exemplary embodiments, due to at least partial mutual cancellation between the capacitive impedance and the inductive impedance, a high power conversion efficiency can be achieved between the feeding apparatus and the target apparatus. Since the direction of the feeding apparatus (e.g., the feeding cable) can be flexibly set, it has a low requirement on the installation space, so that on one hand, the bending can be reduced as much as possible, on the other hand, the structural strength of the feeding structure can be achieved without the need of a secondary soldering process or addition of an additional fastener or the like, thereby effectively reducing the material cost and the process cost.

Figure 7:
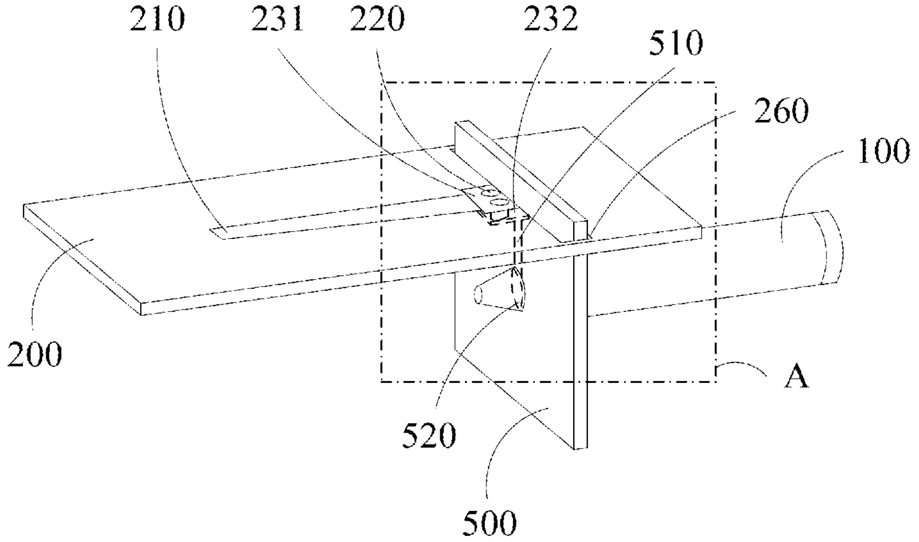
FIG. 7 is a structure schematic diagram showing a signal processing device according to another exemplary embodiment of the present disclosure.
Figure 8:
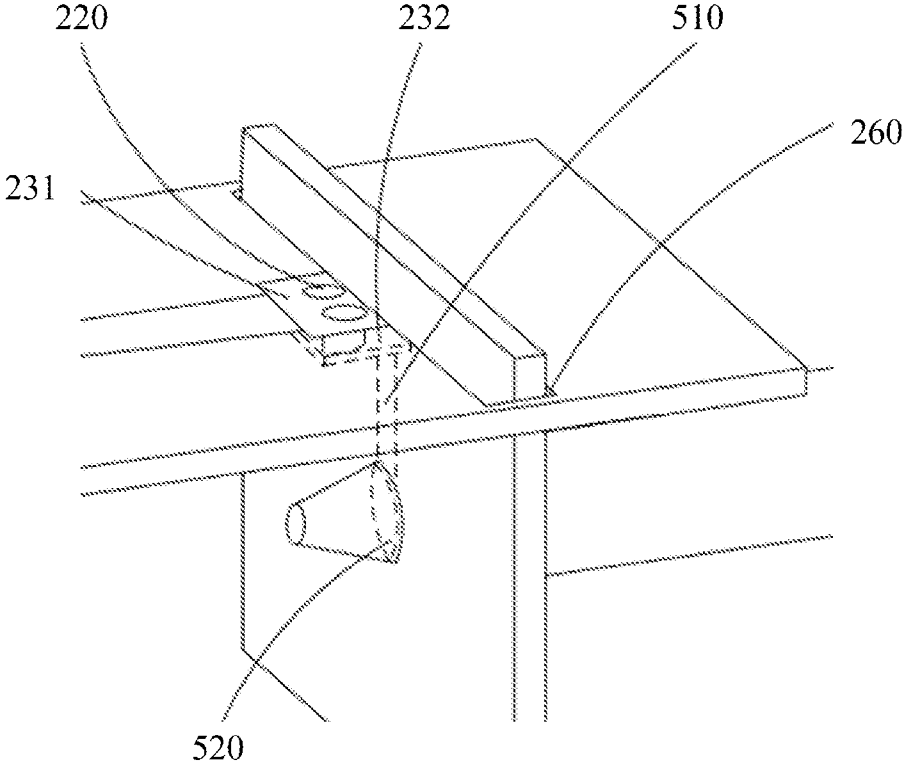
FIG. 8 is a structure schematic diagram showing an enlarged view of a portion A of FIG. 7.

In another exemplary embodiment of the present disclosure, there is provided another signal processing device for realizing connection between the feeding apparatus and the target apparatus through the feeding circuit board. As shown in FIG. 7 and FIG. 8, the signal processing device may include a feeding cable 100, a feeding circuit board 500, and a target circuit board 200 as shown in FIG. 7.

The feeding cable 100 is configured to transmit a radio frequency signal. In some embodiments, the radio frequency signal may be a U-band signal having a center frequency within the 3.6 to 5 GHz frequency band. The feeding cable 100 may also be a coaxial cable, and similar to the coaxial cable in the above embodiment, the first conductor of the feeding cable corresponds to the inner conductor of the coaxial cable, the insulating medium corresponds to the dielectric layer of the coaxial cable and the second conductor corresponds to the outer conductor of the coaxial cable, wherein the first conductor may form a loop with the grounded second conductor, thereby transmitting the radio frequency signal.

The feeding circuit board 500 may include a feeding circuit 510 electrically connected to the feeding cable 100 and configured to transmit the radio frequency signal. In some embodiments, the feeding circuit board 500 may also be a printed circuit board.

As shown in FIG. 7 and FIG. 8, in a specific configuration of connecting the feeding cable 100 and the feeding circuit 510, the feeding circuit board 500 may further include a connection hole 520 penetrating the first and second sides of the feeding circuit board 500. The first conductor of the feeding cable 100 may penetrate from the second side of the feeding circuit board 500 to the first side of the feeding circuit board 500 through the connection hole 520, to be electrically connected with the feeding circuit 510 disposed on the first side of the feeding circuit board 500. The first conductor may be connected to the feeding circuit 510 by a single soldering process, e.g., electrically connected to corresponding terminals, pads, etc. included in the feeding circuit 510.

Figure 9:
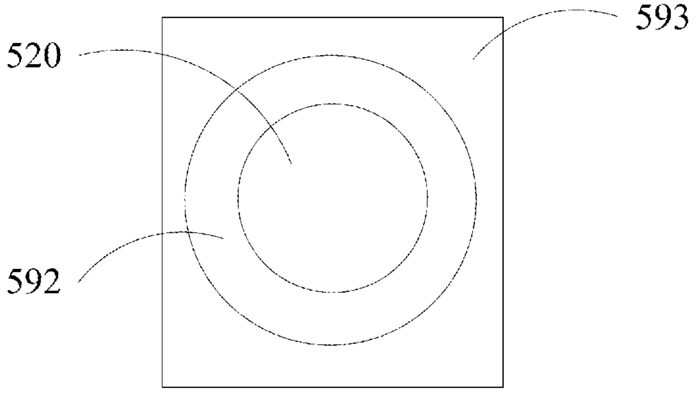
FIG. 9 is a structure schematic diagram showing a portion of a feeding circuit board of the signal processing device of FIG. 7.

The structure of the feeding circuit board is generally a stacked type and may include a ground layer and an insulating layer disposed to be at least partially overlapped from the second side to the first side. That is, the ground layer may be located on the second side of the feeding circuit board for grounding, and the insulating layer of the feeding circuit board is usually located between the layer where the feeding circuit is located in and the ground layer to avoid short-circuiting the feeding circuit with ground. Further, in order to avoid short-circuiting the first conductor passing through the connection hole 520 with the ground layer on the second side of the feeding circuit board, as shown in FIG. 9, on the second side of the feeding circuit board, a portion of the ground layer 593 may be removed/omitted to expose a portion of the insulating layer 592 that surrounds the connection hole 520. In this way, when the first conductor penetrates into the connection hole 520, if it contacts the surrounding wall of the connection hole 520, it will contact the exposed insulation layer 592 directly instead of the ground layer 593, so that the first conductor and the ground layer 593 can be electrically isolated from each other.

In some embodiments, the second conductor on the outer side of the feeding cable may be electrically connected to the ground layer of the feeding circuit board such that the feeding cable and the feeding circuit board are commonly grounded.

In order to achieve the connection between the target circuit board 200 and the feeding circuit board 500, the target circuit board 200 may include the first pad 231, the second pad 232, and the pad hole 220, as shown in FIG. 7 and FIG. 8, wherein the first pad 231 is disposed on the first side of the target circuit board 200, and the first pad 231 is electrically connected to the target circuit 210 disposed on the first side of the target circuit board 200. The second pad 232 is disposed on the second side of the target circuit board 200, and the second pad 232 is electrically connected to the feeding circuit 510. The pad hole 220 penetrates the target circuit board 200 and electrically connects the first pad 231 and the second pad 232, for example, the pad hole 220 may be a conductive via filled with a conductive material. In some embodiments, the first pad 231 is directly connected to the target circuit 210 as shown in FIG. 7, and the second pad 232 is directly connected to the feeding circuit 510. In some embodiments, the feeding circuit 510 may be electrically connected to the second pad 232 by means of soldering. In this way, the radio frequency signal carried by the feeding cable 100 can be fed to the target circuit 210 through the feeding circuit 510.

In order to further enhance the structural strength and stability of the signal processing device, the target circuit board 500 may also be mechanically connected to the feeding circuit board 200 by other means. As shown in FIG. 7 and FIG. 8, target circuit board 200 may include a slot 260 into which the feeding circuit board 500 is inserted to be mechanically connected to target circuit board 200.

In particular, considering that the area of the target circuit board 200 is generally larger than that of the feeding circuit board 500 and a more sufficient space may be provided, thus the slot 260 may be opened on the target circuit board 200. Since the thickness of the target circuit board 200 is generally thin, in order to ensure that the feeding circuit board 500 can be stably connected to the target circuit board 200, the slot 260 may be a through slot that penetrates the target circuit board 200, and the feeding circuit board 500 may be inserted into or removed from the slot 260 in a direction perpendicular or substantially perpendicular to the surface of the target circuit board 200. As shown in FIG. 7 and FIG. 8, the entire surrounding wall of the slot 260 may surround the periphery of the feeding circuit board 500 to help maintain reliability of a plugin structure between the feeding circuit board 500 and the target circuit board 200.

It can be understood that, in other embodiments, the target circuit board 200 and the feeding circuit board 500 may be mechanically connected by other means to secure the structural stability of the signal processing device.

In some embodiments, the position of the feeding circuit board 500 relative to the target circuit board 200 may be configured such that the maximum bending curvature of the feeding cable 100 is less than or equal to a preset curvature threshold. That is, by providing the feeding circuit board 500, it is possible to achieve electrical connection between the target circuit board 200 and the feeding cable 100 while maintaining respective desired arrangement directions of the target circuit board 200 and the feeding cable 100, thereby feeding the radio frequency signal.

As shown in FIG. 7 and FIG. 8, the feeding circuit board 500 may be configured to be perpendicular to the target circuit board 200, and the extension direction of the feeding cable 100 may be configured to be parallel to the surface of the target circuit board 200 and perpendicular to the surface of the feeding circuit board 500.

In the exemplary embodiment, due to the connection between the feeding cable and the feeding circuit board, the introduction of extra impedance is effectively avoided, the problem that the radio frequency signal, especially the U-band signal, has high sensitivity to the capacitive impedance and inductive impedance is overcome, high power conversion efficiency is ensured, and a good feeding effect may be achieved. Furthermore, due to the introduction of the feeding circuit board, the arrangement direction of the feeding cable and the target circuit board is made more flexible, thereby helping to avoid excessive bending of the target circuit board and/or the feeding cable and possible damage caused by the excessive bending, to obtain higher structural reliability. Meanwhile, in the signal processing device of the present embodiment, the feeding apparatus and the target apparatus can be connected without a secondary soldering process, thereby contributing to reduction in the process cost and difficulty.

The present disclosure further provides an antenna system, which may include the signal processing devices described in the above embodiments.

In some embodiments, the operating band of the antenna system may be in the U-band of 3.6 to 5 GHz.

In some embodiments, the antenna system may be a beamforming antenna system to enable transmission or reception of directional signals.

In addition, the embodiments of the present disclosure may further include the following examples.

According to some embodiments of the present disclosure, a signal processing device may include a target apparatus and a feeding apparatus. The feeding apparatus may include: a first conductor configured to transmit a radio frequency signal; an insulating medium covering the first conductor; and a second conductor covering a first portion of the insulating medium. A first portion of the insulating medium may be covered by the second conductor and a second portion of the insulating medium may extend beyond a first end of the second conductor. A first portion of the first conductor may be covered by both the second conductor and the insulating medium and a second portion of the first conductor may extend beyond the first end of the second conductor and may be covered by only the insulating medium. A third portion of the first conductor may extends beyond a first end of the insulating medium. The third portion of the first conductor may be configured to be connected to the target apparatus to feed the radio frequency signal to the target apparatus and is configured to form a capacitive impedance with the target apparatus, the second portion of the first conductor is configured to form an inductive impedance with the target apparatus, and an absolute value of a sum of the capacitive impedance and the inductive impedance is less than or equal to a preset impedance threshold.

In some embodiments of the present disclosure, an absolute value of the capacitive impedance is equal to an absolute value of the inductive impedance.

In some embodiments of the present disclosure, the third portion of the first conductor is configured to be connected to the target apparatus by a single soldering process.

In some embodiments of the present disclosure, the second conductor is configured to be commonly grounded with the target apparatus.

In some embodiments of the present disclosure, the feeding apparatus comprises a feeding cable.

In some embodiments of the present disclosure, a maximum bending curvature of the feeding cable is less than or equal to a preset curvature threshold.

In some embodiments of the present disclosure, the feeding cable is a coaxial cable.

According to some embodiments of the present disclosure, a signal processing device may include a target circuit board and a feeding cable. The target circuit board may include a substrate, a conductive member connecting a first side and an opposite second side of the substrate, and a target circuit disposed on the first side, the conductive member being electrically connected to the target circuit. The feeding cable may include a first conductor electrically connected to the conductive member on the second side of the substrate; and the feeding cable may be configured such that a maximum bending curvature of the feeding cable is less than or equal to a preset curvature threshold in an extension direction thereof.

In some embodiments of the present disclosure, the extension direction of the feeding cable is parallel to a surface of the substrate.

In some embodiments of the present disclosure, the feeding cable further comprises: an insulating medium covers the first conductor; and a second conductor covers the insulating medium. A first portion of the insulating medium may be covered by the second conductor and a second portion of the insulating medium may extend beyond a first end of the second conductor, a first portion of the first conductor may be covered by both the second conductor and the insulating medium, a second portion of the first conductor may extend beyond the first end of the only a second conductor and is covered only by the insulating medium, and a third portion of the first conductor may extend beyond a first end of the insulating medium, In some embodiments of the present disclosure, an absolute value of the capacitive impedance is equal to an absolute value of the inductive impedance.

In some embodiments of the present disclosure, the conductive member comprises: a first pad disposed on the first side of the substrate and electrically connected to the target circuit; a second pad disposed on the second side of the substrate and electrically connected to the first conductor; and a pad hole penetrating through the substrate and electrically connecting the first pad and the second pad.

In some embodiments of the present disclosure, a first pad area of the first pad, a second pad area of the second pad, and an extension length of the second portion of the insulating medium are configured such that the absolute value of the sum of the capacitive impedance and the inductive impedance is less than or equal to the preset impedance threshold.

In some embodiments of the present disclosure, the first pad area is greater than the second pad area.

In some embodiments of the present disclosure, the first conductor is electrically connected to the second pad by means of soldering.

In some embodiments of the present disclosure, the second conductor is commonly grounded with the target circuit board.

In some embodiments of the present disclosure, the feeding cable is a coaxial cable.

In some embodiments of the present disclosure, the first side of the target circuit board is further provided with an electrical isolation region to electrically isolate the first conductor from a ground terminal of the target circuit board.

In some embodiments of the present disclosure, the target circuit comprises at least one of a calibration circuit and a power distribution circuit.

According to some embodiments of the present disclosure, a signal processing device may include a target apparatus and a feeding apparatus. The feeding apparatus may include a first connection member configured to form a capacitive impedance with the target apparatus; and a second connection member electrically connected to the first connection member. The second connection member may be configured to form an inductive impedance with the target apparatus. At least one of the first connection member and the second connection member may be configured to be directly electrically connected to the target apparatus, so as to feed a radio frequency signal passed through the first connection member and the second connection member to the target apparatus, and an absolute value of a sum of the capacitive impedance and the inductive impedance may be less than or equal to a preset impedance threshold.

In some embodiments of the present disclosure, an absolute value of the capacitive impedance is equal to an absolute value of the inductive impedance.

According to some embodiments of the present disclosure, a signal processing device may include a feeding cable configured to transmit a radio frequency signal; a feeding circuit board comprising a feeding circuit electrically connected to the feeding cable and configured to transmit the radio frequency signal; and a target circuit board comprising a target circuit electrically connected to the feeding circuit, and the target circuit board being mechanically connected to the feeding circuit board. A position of the feeding circuit board relative to the target circuit board is configured such that a maximum bending curvature of the feeding cable is less than or equal to a preset curvature threshold.

In some embodiments of the present disclosure, the target circuit board comprises a slot into which the feeding circuit board is inserted to be mechanically connected to the target circuit board.

In some embodiments of the present disclosure, the feeding circuit board may include a connection hole that penetrates through a first side and a second side of the feeding circuit board, the feeding circuit being disposed on the first side of the feeding circuit board, and the feeding cable may include a first conductor configured to transmit the radio frequency signal, the first conductor penetrating from the second side of the feeding circuit board to the first side of the feeding circuit board through the connection hole so as to be electrically connected to the feeding circuit.

In some embodiments of the present disclosure, the feeding circuit board may include a ground layer and an insulating layer disposed to be at least partially overlapped from the second side to the first side. A portion of the insulating layer surrounding the connection hole may be exposed outside the ground layer to electrically isolate the first conductor from the ground layer In some embodiments of the present disclosure, the first conductor may be connected to the feeding circuit by a single soldering process.

In some embodiments of the present disclosure, the target circuit board may include: a first pad disposed on a first side of the target circuit board and electrically connected to the target circuit disposed on the first side of the target circuit board; a second pad disposed on a second side of the target circuit board and electrically connected to the feeding circuit; and a pad hole penetrating through the target circuit board and connecting the first pad and the second pad.

In some embodiments of the present disclosure, the feeding circuit board may be configured to be perpendicular to the target circuit board, and an extension direction of the feeding cable is configured to be parallel to a surface of the target circuit board and perpendicular to a surface of the feeding circuit board.

According to some embodiments of the present disclosure, an antenna system comprising the signal processing device as described herein is provided.

In some embodiments of the present disclosure, the antenna system may be configured to operate in all or a portion of a 3.6 to 5 GHz frequency band.

In some embodiments of the present disclosure, the antenna system may be a beamforming antenna system.

The terms “front,” “back,” “top,” “bottom,” “over,” “under” and the like, as used herein, if any, are used for descriptive purposes and not necessarily for describing permanent relative positions. It should be understood that such terms are interchangeable under appropriate circumstances such that the embodiments of the disclosure described herein are, for example, capable of operation in other orientations than those illustrated or otherwise described herein.

The term “exemplary”, as used herein, means “serving as an example, instance, or illustration”, rather than as a “model” that would be exactly duplicated. Any implementation described herein as exemplary is not necessarily to be construed as preferred or advantageous over other implementations. Furthermore, there is no intention to be bound by any expressed or implied theory presented in the preceding technical field, background, summary or detailed description.

The term “substantially”, as used herein, is intended to encompass any slight variations due to design or manufacturing imperfections, device or component tolerances, environmental effects and/or other factors. The term “substantially” also allows for variation from a perfect or ideal case due to parasitic effects, noise, and other practical considerations that may be present in an actual implementation.

In addition, the foregoing description may refer to elements or nodes or features being “connected” or “coupled” together. As used herein, unless expressly stated otherwise, “connected” means that one element/node/feature is electrically, mechanically, logically or otherwise directly joined to (or directly communicates with) another element/node/feature. Likewise, unless expressly stated otherwise, “coupled” means that one element/node/feature may be mechanically, electrically, logically or otherwise joined to another element/node/feature in either a direct or indirect manner to permit interaction even though the two features may not be directly connected. That is, “coupled” is intended to encompass both direct and indirect joining of elements or other features, including connection with one or more intervening elements.

In addition, certain terminology, such as the terms “first”, “second” and the like, may also be used in the following description for the purpose of reference only, and thus are not intended to be limiting. For example, the terms “first”, “second” and other such numerical terms referring to structures or elements do not imply a sequence or order unless clearly indicated by the context.

Further, it should be noted that, the terms “comprise”, “include”, “have” and any other variants, as used herein, specify the presence of stated features, integers, steps, operations, elements, and/or components, but do not preclude the presence or addition of one or more other features, integers, steps, operations, elements, components, and/or groups thereof.

In this disclosure, the term “provide” is intended in a broad sense to encompass all ways of obtaining an object, thus the expression “providing an object” includes but is not limited to “purchasing”, “preparing/manufacturing”, “disposing/arranging”, “installing/assembling”, and/or “ordering” the object, or the like.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. However, other modifications, variations and alternatives are also possible. The description and drawings are, accordingly, to be regarded in an illustrative rather than in a restrictive sense.

Although some specific embodiments of the present disclosure have been described in detail with examples, it should be understood by a person skilled in the art that the above examples are only intended to be illustrative but not to limit the scope of the present disclosure. The embodiments disclosed herein can be combined arbitrarily with each other, without departing from the scope and spirit of the present disclosure. It should be understood by a person skilled in the art that the above embodiments can be modified without departing from the scope and spirit of the present disclosure. The scope of the present disclosure is defined by the attached claims.

What is claimed is:

1. A signal processing device comprising a target apparatus and a feeding apparatus, wherein the feeding apparatus comprises:

a first conductor configured to transmit a radio frequency signal;

an insulating medium covering the first conductor; and a second conductor covering the insulating medium;

wherein a first portion of the insulating medium is covered by the second conductor and a second portion of the insulating medium extends beyond a first end of the second conductor, wherein a first portion of the first conductor is covered by both the second conductor and the insulating medium, a second portion of the first conductor extends beyond the first end of the second conductor and is covered by the insulating medium, and a third portion of the first conductor extends beyond a first end of the insulating medium, and wherein the third portion of the first conductor is configured to be connected to the target apparatus to feed the radio frequency signal to the target apparatus and is configured to form a capacitive impedance with the target apparatus, the second portion of the first conductor is configured to form an inductive impedance with the target apparatus, and an absolute value of a sum of the capacitive impedance and the inductive impedance is less than or equal to a preset impedance threshold.

2. The signal processing device according to claim 1, wherein an absolute value of the capacitive impedance is equal to an absolute value of the inductive impedance.

3. The signal processing device according to claim 1, wherein the third portion of the first conductor is configured to be connected to the target apparatus by a single soldering process.

4. The signal processing device according to claim 1, wherein the second conductor is configured to be commonly grounded with the target apparatus.

5. The signal processing device according to claim 1, wherein the feeding apparatus comprises a feeding cable.

6. The signal processing device according to claim 5, wherein a maximum bending curvature of the feeding cable is less than or equal to a preset curvature threshold.

7. The signal processing device according to claim 5, wherein the feeding cable is a coaxial cable.

8. A signal processing device, comprising:

a target circuit board comprising a substrate, a conductive member connecting a first side and an opposite second side of the substrate, and a target circuit disposed on the first side, the conductive member being electrically connected to the target circuit; and a feeding cable comprising a first conductor electrically connected to the conductive member on the opposite second side of the substrate;

wherein the feeding cable is configured such that a maximum bending curvature of the feeding cable is less than or equal to a preset curvature threshold in an extension direction thereof.

9. The signal processing device according to claim 8, wherein the extension direction of the feeding cable is parallel to a surface of the substrate.

10. The signal processing device according to claim 8, wherein the feeding cable further comprises:

an insulating medium covering the first conductor; and a second conductor covering the insulating medium, wherein a first portion of the insulating medium is covered by the second conductor and a second portion of the insulating medium extends beyond a first end of the second conductor, wherein a first portion of the first conductor is covered by both the second conductor and the insulating medium, a second portion of the first conductor extends beyond the first end of the second conductor and is covered by the insulating medium, and a third portion of the first conductor extends beyond a first end of the insulating medium, wherein the target circuit board and the third portion of the first conductor form a capacitive impedance, the target circuit board and the second portion of the first conductor form an inductive impedance, and an absolute value of a sum of the capacitive impedance and the inductive impedance is less than or equal to a preset impedance threshold.

11. The signal processing device according to claim 10, wherein an absolute value of the capacitive impedance is equal to an absolute value of the inductive impedance.

12. The signal processing device according to claim 10, wherein the conductive member comprises:

a first pad disposed on the first side of the substrate and electrically connected to the target circuit;

a second pad disposed on the opposite second side of the substrate and electrically connected to the first conductor; and a pad hole penetrating through the substrate and electrically connecting the first pad and the second pad.

13. The signal processing device according to claim 12, wherein a first pad area of the first pad, a second pad area of the second pad, and an extension length of the second portion of the insulating medium are configured such that the absolute value of the sum of the capacitive impedance and the inductive impedance is less than or equal to the preset impedance threshold.

14. The signal processing device according to claim 13, wherein the first pad area is greater than the second pad area.

15. The signal processing device according to claim 12, wherein the first conductor is electrically connected to the second pad via a soldered connection.

16. The signal processing device according to claim 10, wherein the second conductor is commonly grounded with the target circuit board.

17. The signal processing device according to claim 8, wherein the target circuit comprises at least one of a calibration circuit and a power distribution circuit.

18. The signal processing device according to claim 8, wherein the first side of the target circuit board is further provided with an electrical isolation region to electrically isolate the first conductor from a ground terminal of the target circuit board.

19. A signal processing device comprising a target apparatus and a feeding apparatus, wherein the feeding apparatus comprises:

a first connection member configured to form a capacitive impedance with the target apparatus; and a second connection member electrically connected to the first connection member, the second connection member configured to form an inductive impedance with the target apparatus;

wherein at least one of the first connection member and the second connection member is configured to be directly electrically connected to the target apparatus, so as to feed a radio frequency signal passed through the first connection member and the second connection member to the target apparatus, and an absolute value of a sum of the capacitive impedance and the inductive impedance is less than or equal to a preset impedance threshold.

20. The signal processing device according to claim 19, wherein an absolute value of the capacitive impedance is equal to an absolute value of the inductive impedance.

* * * * *